US012552932B2

(12) United States Patent
He et al.

(10) Patent No.: US 12,552,932 B2
(45) Date of Patent: Feb. 17, 2026

(54) POLYAMIDE COMPOSITE MATERIAL AND PREPARATION METHOD THEREOF

(71) Applicant: KINGFA SCI. & TECH. CO., LTD., Guangdong (CN)

(72) Inventors: Yong He, Guangdong (CN); Xianbo Huang, Guangdong (CN); Nanbiao Ye, Guangdong (CN); Yiquan Zheng, Guangdong (CN); Chao Ding, Guangdong (CN)

(73) Assignee: KINGFA SCI. & TECH. CO., LTD., Guangdong (CN)

( * ) Notice: Subject to any disclaimer, the term of this patent is extended or adjusted under 35 U.S.C. 154(b) by 630 days.

(21) Appl. No.: 17/920,807

(22) PCT Filed: Nov. 19, 2020

(86) PCT No.: PCT/CN2020/130129
§ 371 (c)(1),
(2) Date: Oct. 24, 2022

(87) PCT Pub. No.: WO2021/212819
PCT Pub. Date: Oct. 28, 2021

(65) Prior Publication Data
US 2023/0167299 A1 Jun. 1, 2023

(30) Foreign Application Priority Data
Apr. 24, 2020 (CN) .......................... 202010333634.4

(51) Int. Cl.
| C08L 77/02 | (2006.01) |
| C08K 3/40 | (2006.01) |
| C08K 7/14 | (2006.01) |
| C08L 27/18 | (2006.01) |
| C08L 77/06 | (2006.01) |

(52) U.S. Cl.
CPC ............. *C08L 77/02* (2013.01); *C08K 3/40* (2013.01); *C08K 7/14* (2013.01); *C08L 27/18* (2013.01); *C08L 77/06* (2013.01)

(58) Field of Classification Search
None
See application file for complete search history.

(56) References Cited

U.S. PATENT DOCUMENTS

| 2004/0235987 A1* | 11/2004 | Fischer ............ F02M 35/10334 |
| | | 524/494 |
| 2021/0147676 A1* | 5/2021 | Bauer .................. C08K 5/5205 |
| 2024/0150533 A1* | 5/2024 | Tanaka .................. C08F 114/26 |

FOREIGN PATENT DOCUMENTS

| CN | 103602064 | 2/2014 |
| CN | 105949763 | 9/2016 |
| CN | 108530888 | 9/2018 |
| CN | 110452529 | 11/2019 |
| CN | 111574829 | 8/2020 |
| WO | 2010127596 | 11/2010 |

OTHER PUBLICATIONS

"International Search Report (Form PCT/ISA/210) of PCT/CN2020/130129", mailed on Feb. 5, 2021, with English translation thereof, pp. 1-6.

Yue Qun-Feng et al., "Effect of Filled PTFE on Friction and Wear Property of Glass Fiber Reinforced Polyamide 66 Composites," Materials for Mechanical Engineering, vol. 29, Oct. 2005, pp. 1-3.

* cited by examiner

*Primary Examiner* — Robert T Butcher
(74) *Attorney, Agent, or Firm* — JCIPRNET

(57) ABSTRACT

The present invention provides a polyamide composite material, which includes the following components in parts by weight: 25-85 parts of a polyamide resin; 10-50 parts of a glass fiber; 5-25 parts of polytetrafluoroethylene; and 0.1-2 parts of at least one of a K/Na/Ca/Mg/Ba/Zn/Li/Al salt of montanic acid. The montanate can effectively inhibit free hydrogen fluoride in the polytetrafluoroethylene, thereby effectively inhibiting free silicon in the glass fiber and improving the electrical performance of the material.

10 Claims, No Drawings

POLYAMIDE COMPOSITE MATERIAL AND PREPARATION METHOD THEREOF

CROSS-REFERENCE TO RELATED APPLICATION

This application is a 371 application of International PCT application serial no. PCT/CN2020/130129 filed on Nov. 19, 2020, which claims the priority benefit of China application no. 202010333634.4, filed on Apr. 24, 2020. The entirety of each of the above mentioned patent applications is hereby incorporated by reference herein and made a part of this specification.

TECHNICAL FIELD

The present invention relates to the technical field of polymer materials, and in particular to a polyamide composite material and a preparation method thereof.

DESCRIPTION OF RELATED ART

A polyamide resin has an excellent mechanical performance, excellent barrier properties, heat resistance, wear resistance, chemical corrosion resistance and the like excellent comprehensive properties, and is widely applied in fields of machinery manufacturing, electric power tools, electronic appliances, transportation and the like. Polyamide (PA) has an excellent mechanical performance, processability, self-lubrication properties, thermal stability and chemical stability, and is widely applied in fields of automobiles, electronic appliances, electric power tools, etc. It is one of the engineering plastics with the largest output and the widest application range in the world currently.

However, the existence of free silicon will limit the application of a PA material. For example, in the relay industry, the content of the free silicon is controlled in addition to the conventional performance and molding requirements of the PA material, due to the reason that the free silicon will be oxidized by a current arc in a relay, and a poor insulation layer will be formed and distributed between metal contact points of the relay, resulting in working failure of the relay. The free silicon is generally derived from low molecular weight silicone in a silicone rubber and a silicone resin, as well as inorganic silicon that can be gasified, etc.

SUMMARY

An objective of the present invention is to provide a polyamide composition which can inhibit the formation of free silicon in the composition while having the advantages of reinforcement and wear resistance.

Another objective of the present invention is to provide a method for preparing the aforementioned polyamide composition.

The present invention is realized by the following technical solutions.

A polyamide composite material includes the following components in parts by weight:
25-85 parts of a polyamide resin;
10-50 parts of a glass fiber;
5-25 parts of polytetrafluoroethylene; and
0.1-2 parts of at least one of a K/Na/Ca/Mg/Ba/Zn/Li/Al salt of montanic acid.

The polyamide is selected from polyamide obtained by polycondensation of at least one aliphatic dicarboxylic acid with at least one aliphatic diamine or cyclic diamine, or polyamide obtained by polycondensation of at least one aromatic dicarboxylic acid with at least one aliphatic diamine, or polyamide obtained by polycondensation of at least one amino acid or lactam with itself, or a mixture or copolyamide thereof.

The polyamide resin is selected from at least one of PA6, PA66, PA56, PA610, PA612, PA510, PA46 and PA9T.

Preferably, the K/Na/Ca/Mg/Ba/Zn/Li/Al salt of montanic acid is selected from at least one of sodium montanate and magnesium montanate. The inventors have conducted comparative experiments on the K, Na, Ca, Mg, Ba, Zn, Li, Al salts of montanic acid respectively, and found that sodium montanate and magnesium montanate have better effects.

The glass fiber is selected from at least one of an E glass fiber, a H glass fiber, a R glass fiber, a S glass fiber, a D glass fiber and a C glass fiber.

Preferably, the glass fiber is selected from an E glass fiber. By conducting comparative experiments of the aforementioned glass fibers experimentally, it is found that the E glass fiber can effectively inhibit the formation of the free silicon.

The glass fiber is selected from at least one of a long glass fiber and a chopped glass fiber.

The polytetrafluoroethylene that can be used in the system of the present invention has a molecular weight in a range of 10,000-10,000,000 g/mol.

Preferably, the content of free hydrogen fluoride in the polytetrafluoroethylene is less than 300 ppm based on the total mass of the polytetrafluoroethylene. Upon experimental analysis, it is found that the main reason for the generation of the free silicon is the corrosion of the glass fiber by hydrogen fluoride generated by decomposition of the polytetrafluoroethylene. Generally, the lower the content of free hydrogen fluoride in the polytetrafluoroethylene selected, the easier it is to suppress the content of the free silicon in the polyamide composite material. However, if only the polytetrafluoroethylene with low content of hydrogen fluoride is selected, rather than employing other ways of inhibiting the free silicon, the formation of the free silicon cannot be effectively inhibited. This is because hydrogen fluoride gas is also generated by decomposition during the processes of melt mixing and shearing processing, which in turn leads to the rise of the free silicon. Therefore, it is the key of the present invention to inhibit the generation of hydrogen fluoride from decomposition of the polytetrafluoroethylene during the process of processing.

On the control of the molecular weight of the polytetrafluoroethylene and the content of the free hydrogen fluoride: polytetrafluoroethylene micropowder with a molecular weight of about 10,000,000 g/mol (g/mol) is sheared by high-energy electron beam irradiation at room temperature (with an irradiation equivalent of 50 kGy-100 kGy) to obtain polytetrafluoroethylene with different molecular weights. The obtained polytetrafluoroethylene micropowder is treated at 400° C. for 1-24 hours to remove the free hydrogen fluoride formed during the irradiation process. Through such a process, we obtain polytetrafluoroethylene micropowder (polytetrafluoroethylene 1, polytetrafluoroethylene 2, and polytetrafluoroethylene 3) with different molecular weights and contents of free hydrogen fluoride. The determination of the free hydrogen fluoride is referred to the determination method of ANSI/ASTM D4755-1995.

A method for preparing the aforementioned polyamide composite material includes the following steps: mixing a polyamide resin, a K/Na/Ca/Mg/Ba/Zn/Li/Al salt of montanic acid and polytetrafluoroethylene uniformly, and then granulating by extruding with a twin-screw extruder (main feeding of a chopped glass fiber/side feeding of a long glass fiber) to obtain the polyamide composite material, wherein a screw temperature ranges from 220-270° C., and a rotating speed is 300-450 rpm.

The present invention has the following beneficial effects.

Hydrogen fluoride is easily generated by decomposition of the polytetrafluoroethylene during the process of high-temperature processing, and acidic hydrogen fluoride can corrode the glass fiber to make silicon free (generally, containing more than 0.8 ppm of the free silicon in the polyamide composite material will bring about the reduction of the electrical performance). In the present invention, by adding the montanate, the decomposition of the polytetrafluoroethylene during the process of high-temperature processing can be inhibited, which in turn improves the corrosion of the hydrogen fluoride to the glass fiber. Furthermore, the corrosion of the hydrogen fluoride to the glass fiber can also be further reduced by selecting the polytetrafluoroethylene with low content of the free hydrogen fluoride.

DESCRIPTION OF THE EMBODIMENTS

The present invention will be described in detail hereafter with reference to specific examples. The following examples will facilitate further understanding of the present invention by those skilled in the art, but will not limit the present invention in any way. It should be pointed out that for those of ordinary skills in the art, several modifications and improvements can be made without departing from the concept of the present invention. These all belong to the claimed scope of the present invention.

The raw materials used in the present invention come from commercially available products:
PA66: PA66EP-158, available from Huafon Group, Zhejiang;
PA6: HY2800A, available from Haiyang Chemical Fiber Group Co Ltd.;
PA10T: VESTAMID HTplus M1000, available from Evonik Industries AG;
PA-MXD6: RENY 1002H, available from Mitsubishi Chemical Corporation;
Glass fiber 1: an E glass fiber, ECS301HP-3-H, chopped, available from Chongqing Polycomp International Corporation;
Glass fiber 2: a S glass fiber, S-1 HM435TM-10-3.0, chopped.
Polytetrafluoroethylene 1: having a content of free hydrogen fluoride of 500 ppm; and a molecular weight of: $3.5 \times 10^5$-$3.9 \times 10^5$ g/mol.
Polytetrafluoroethylene 2: having a content of free hydrogen fluoride of 300 ppm; and a molecular weight of: $3.3 \times 10^5$-$3.8 \times 10^5$ g/mol.
Polytetrafluoroethylene 3: having a content of free hydrogen fluoride of 30 ppm; and a molecular weight of: $3.4 \times 10^5$-$3.9 \times 10^5$ g/mol.
Sodium montanate, magnesium montanate, aluminum montanate and calcium montanate are commercially available.
Calcium stearate: available from Shanghai Aladdin Biochemical Technology Co., Ltd.;
fatty acid ester 1: LOXIOL G 32, available from EmeryOleochemicals LLC; and
fatty acid ester 2: Loxiol EP-PTS, available from EmeryOleochemicals LLC.

A method for preparing the polyamide compositions of Embodiments and Comparative Examples: mixing a polyamide resin, a K/Na/Ca/Mg/Ba/Zn/Li/Al salt of montanic acid (or other lubricants) and polytetrafluoroethylene uniformly, and then granulating by extruding with a twin-screw extruder (main feeding of a chopped glass fiber/side feeding of a long glass fiber) to obtain the polyamide composite material, wherein a screw temperature ranges from 220-270° C., and a rotating speed is 300-450 rpm.

Determination of free silicon content: referring to GB/T 23842-2009 (General method for the determination of silicon content of inorganic chemicals—Reduced molybdosilicate spectrophotometric method), the determination of free silicon was carried out by silicon molybdenum blue spectrophotometry: 1 g of a crushed sample was taken and put in a plastic flask, and added with 15 ml of n-hexane for extraction for 24 h, and then the extract liquor was transferred into a silver crucible. The silver crucible was added with 2 ml of a 50% sodium hydroxide solution, placed on an electric heating plate, and heated to 500° C., for 40 min for inorganic transformation of free silicon. The inorganic product was dissolved in 20 ml of distilled water, then acidified to a pH value of about 2-3 by adding a 5 mol/L sulfuric acid (analytically pure) solution, and then added with 2 ml of a 5% ammonium molybdate (analytically pure) solution and 0.2 ml of a 1% stannous chloride (analytically pure) solution for a color development reaction. The developed solution was taken and tested with an ultraviolet spectrophotometer, and the test result was compared with an established silicon standard line to get the silicon content. The establishment of the silicon standard line: a silicon standard solution was taken and formulated into solutions with silicon concentrations of 0.1, 0.25, 0.50, 1.00, 2.0 ppm with deionized water, and tested with the ultraviolet spectrophotometer to establish the standard line, with the wavelength being taken at 810 nm. The silicon standard line conformed to y=0.535x+0.013, $R^2$=0.999.

TABLE 1

Proportion (parts by weight) and test results of polyamide compositions of Embodiments 1-6

| | Embodiment 1 | Embodiment 2 | Embodiment 3 | Embodiment 4 | Embodiment 5 | Embodiment 6 |
|---|---|---|---|---|---|---|
| PA6 | 65 | | | | 25 | 65 |
| PA66 | | 65 | | | 40 | |
| PA10T | | | 65 | | | |
| MXD6 | | | | 65 | | |
| Glass fiber 1 | 20 | 20 | 20 | 20 | 20 | 20 |
| Glass fiber 2 | | | | | | |
| Polytetrafluoroethylene 3 | 15 | 15 | 15 | 15 | 15 | 15 |

TABLE 1-continued

Proportion (parts by weight) and test results of polyamide compositions of Embodiments 1-6

|  | Embodiment 1 | Embodiment 2 | Embodiment 3 | Embodiment 4 | Embodiment 5 | Embodiment 6 |
|---|---|---|---|---|---|---|
| Sodium montanate | 0.2 | 0.2 | 0.2 | 0.2 | 0.2 | 0.6 |
| Content of free silicon, in ppm | 0.2 | 0.3 | 0.5 | 0.4 | 0.3 | 0.1 |

It could be seen from Embodiments 1 and 6 that the addition of sodium montanate could effectively reduce the content of the free silicon.

TABLE 2

Proportion (parts by weight) and test results of polyamide compositions of Embodiments 7-12

|  | Embodiment 7 | Embodiment 8 | Embodiment 9 | Embodiment 10 | Embodiment 11 | Embodiment 12 |
|---|---|---|---|---|---|---|
| PA6 | 65 | 65 | 65 | 65 | 65 | 65 |
| Glass fiber 1 | 20 | 20 |  | 20 | 20 | 20 |
| Glass fiber 2 |  |  | 20 |  |  |  |
| Polytetrafluoroethylene 3 |  |  | 15 | 15 | 15 | 15 |
| Polytetrafluoroethylene 2 | 15 |  |  |  |  |  |
| Polytetrafluoroethylene 1 |  | 15 |  |  |  |  |
| Sodium montanate | 0.2 | 0.2 | 0.2 |  |  |  |
| Magnesium montanate |  |  |  | 0.2 |  |  |
| Aluminium montanate |  |  |  |  | 0.2 |  |
| Calcium montanate |  |  |  |  |  | 0.2 |
| Content of free silicon, in ppm | 0.3 | 0.5 | 0.6 | 0.3 | 0.5 | 0.6 |

It could be seen from Embodiments 1/7/8 that the content of the free silicon is decreased significantly when the polytetrafluoroethylene with a low content of free hydrogen fluoride was employed, which indicated that the free silicon in the polyimide composition was sourced from the corrosion of the hydrogen fluoride released from the polytetrafluoroethylene to the glass fiber.

It could be seen from Embodiments 1/9 that the E glass was preferred, which had less free silicon.

It could be seen from Embodiments 1/10/11/12 that sodium montanate and magnesium montanate were preferred for optimum inhibition on free silicon.

TABLE 3

Proportion (parts by weight) and test results of polyamide compositions of Comparative Examples

|  | Comparative Example 1 | Comparative Example 2 | Comparative Example 3 | Comparative Example 4 | Comparative Example 5 | Comparative Example 6 |
|---|---|---|---|---|---|---|
| PA6 | 65 | 65 | 65 | 65 | 65 | 65 |
| Glass fiber 1 | 20 | 20 | 20 | 20 | 20 | 20 |
| Polytetrafluoro-ethylene 3 | 15 | 15 | 15 | 15 | 15 | 15 |
| Calcium stearate | 0.2 | 0.5 | 0.8 |  |  |  |
| Fatty acid ester 1 |  |  |  | 0.6 |  |  |
| Fatty acid ester 2 |  |  |  |  | 0.6 |  |

TABLE 3-continued

Proportion (parts by weight) and test results of polyamide compositions of Comparative Examples

|  | Comparative Example 1 | Comparative Example 2 | Comparative Example 3 | Comparative Example 4 | Comparative Example 5 | Comparative Example 6 |
|---|---|---|---|---|---|---|
| Content of free silicon, in ppm | 2.2 | 2.0 | 1.9 | 2.3 | 2.0 | 2.4 |

It could be seen from Comparative Examples 1-6 that the content of free silicon could not be reduced by employing traditional lubricants such as calcium stearate, fatty acid ester and the like. The production of free silicon could not be effectively inhibited by the addition of calcium stearate and fatty acid ester.

What is claimed is:

1. A polyamide composite material, comprising following components in parts by weight:
   25-85 parts of a polyamide resin;
   10-50 parts of a glass fiber;
   5-25 parts of polytetrafluoroethylene; and
   0.1-2 parts of a Mg salt of montanic acid,
   wherein a content of free hydrogen fluoride in the polytetrafluoroethylene is less than 300 ppm based on a total mass of the polytetrafluoroethylene.

2. The polyamide composite material according to claim 1, wherein the polyamide resin is selected from polyamide obtained by polycondensation of at least one aliphatic dicarboxylic acid with at least one aliphatic diamine or cyclic diamine, or polyamide obtained by polycondensation of at least one aromatic dicarboxylic acid with at least one aliphatic diamine, or polyamide obtained by polycondensation of at least one amino acid or lactam with itself, or a mixture or copolyamide thereof.

3. The polyamide composite material according to claim 2, wherein the polyamide resin is selected from at least one of PA6, PA66, PA56, PA610, PA612, PA510, PA46 and PA9T.

4. The polyamide composite material according to claim 1, wherein the glass fiber is selected from at least one of an E glass fiber, a H glass fiber, a R glass fiber, a S glass fiber, a D glass fiber and a C glass fiber.

5. The polyamide composite material according to claim 4, wherein the glass fiber is the E glass fiber.

6. The polyamide composite material according to claim 1, wherein the glass fiber is selected from at least one of a long glass fiber and a chopped glass fiber.

7. The polyamide composite material according to claim 1, wherein the polytetrafluoroethylene has a molecular weight in a range of 10,000-10,000,000 g/mol.

8. A method for preparing the polyamide composite material according to claim 1, comprising following steps: mixing the polyamide resin, the Mg salt of montanic acid and the polytetrafluoroethylene uniformly, and then granulating by extruding with a twin-screw extruder to obtain the polyamide composite material, wherein a screw temperature ranges from 220-270° C., and a rotating speed is 300-450 rpm, wherein in the twin-screw extruder, a chopped glass fiber is added in a main feeding, and a long glass fiber is added in a side feeding.

9. The polyamide composite material according to claim 4, wherein the glass fiber is selected from at least one of a long glass fiber and a chopped glass fiber.

10. The polyamide composite material according to claim 5, wherein the glass fiber is selected from at least one of a long glass fiber and a chopped glass fiber.

\* \* \* \* \*